(12) United States Patent
Vissers et al.

(10) Patent No.: US 9,540,705 B2
(45) Date of Patent: Jan. 10, 2017

(54) METHOD OF MANUFACTURING A BEARING RING

(75) Inventors: Cornelius Petrus Antonius Vissers, Den Dungen (NL); Hendrikus Jan Kapaan, Nieuwegein (NL); Johannes Franciscus Van De Sanden, Nieuwegein (NL); Jacobus Zwarts, Nieuwegein (NL)

(73) Assignee: AKTIEBOLAGET SKF, Gothenburg (SE)

( * ) Notice: Subject to any disclaimer, the term of this patent is extended or adjusted under 35 U.S.C. 154(b) by 607 days.

(21) Appl. No.: 13/201,290

(22) PCT Filed: Mar. 19, 2009

(86) PCT No.: PCT/EP2009/002038
§ 371 (c)(1),
(2), (4) Date: Nov. 10, 2011

(87) PCT Pub. No.: WO2010/105644
PCT Pub. Date: Sep. 23, 2010

(65) Prior Publication Data
US 2012/0055587 A1    Mar. 8, 2012

(51) Int. Cl.
*C21D 8/00* (2006.01)
*B22D 27/08* (2006.01)
(Continued)

(52) U.S. Cl.
CPC .............. *C21D 9/40* (2013.01); *B22D 19/00* (2013.01); *B22D 21/04* (2013.01); *B22D 27/20* (2013.01);
(Continued)

(58) Field of Classification Search
CPC .................................. C21D 8/00; B22D 27/08
USPC ..................................... 148/516; 420/557–562
See application file for complete search history.

(56) References Cited

U.S. PATENT DOCUMENTS 2,288,656 A  *  7/1942  Smart ........................... 428/642
2,352,206 A  *  6/1944  Kendall ........................ 384/476
(Continued)

FOREIGN PATENT DOCUMENTS

CN          1347462 A      5/2002
JP          07174144 A     7/1995
(Continued)

*Primary Examiner* — Jessee Roe
*Assistant Examiner* — Jenny Wu
(74) *Attorney, Agent, or Firm* — Bryan Peckjian; SKF USA Inc. Patent Dept.

(57) ABSTRACT

The present invention resides in a method of manufacturing a bearing ring (101) for a rolling element bearing, wherein the bearing ring comprises a bearing race (102) made of a bearing grade steel and an overmolded part (106) that is preferably made of a lightweight metal such as aluminum or a thermoplastic material such as polyamide. According to the invention, the method comprises a step of hardening at least a raceway surface (103) of the bearing race prior to a step of joining the overmolded part (106) to the bearing race (102) in a molding process. In a further development, the method comprises a step of temperature control, to ensure that the temperature of the raceway surface (103) is kept below a predetermined value during the molding process.

6 Claims, 3 Drawing Sheets

(51) Int. Cl.

| | | |
|---|---|---|
| *B21D 53/10* | (2006.01) | |
| *C22F 1/00* | (2006.01) | |
| *C21D 9/40* | (2006.01) | |
| *B22D 19/00* | (2006.01) | |
| *B22D 21/04* | (2006.01) | |
| *B22D 27/20* | (2006.01) | |
| *C21D 1/06* | (2006.01) | |
| *C21D 1/18* | (2006.01) | |
| *F16C 19/52* | (2006.01) | |
| *F16C 33/60* | (2006.01) | |
| *F16C 33/64* | (2006.01) | |

(52) U.S. Cl.
CPC . *C21D 1/06* (2013.01); *C21D 1/18* (2013.01); *F16C 19/525* (2013.01); *F16C 33/60* (2013.01); *F16C 33/64* (2013.01); *F16C 2202/24* (2013.01); *F16C 2220/04* (2013.01); *Y10T 29/49636* (2015.01)

(56) References Cited

U.S. PATENT DOCUMENTS

| | | | |
|---|---|---|---|
| 2,881,490 A * | 4/1959 | Benham | 164/69.1 |
| 4,055,227 A | 10/1977 | Brackett | |
| 4,191,238 A * | 3/1980 | Pichl | B22D 19/02 164/100 |
| 6,309,759 B1 * | 10/2001 | Tomikawa et al. | 428/642 |
| 6,475,309 B1 | 11/2002 | Fogelstrom et al. | |
| 2003/0002759 A1 | 1/2003 | Yabe et al. | |
| 2003/0124391 A1 * | 7/2003 | Vetter | C23C 14/0676 428/698 |
| 2008/0145264 A1 * | 6/2008 | Hetzner et al. | 420/101 |
| 2008/0207426 A1 * | 8/2008 | Forsman-White | 501/32 |
| 2009/0078339 A1 * | 3/2009 | Volkmuth et al. | 148/210 |
| 2010/0215296 A1 * | 8/2010 | Dahlman | 384/51 |
| 2011/0100800 A1 * | 5/2011 | Gorokhovsky | C23C 14/0605 204/192.12 |
| 2011/0120665 A1 * | 5/2011 | Fukuda | 164/437 |

FOREIGN PATENT DOCUMENTS

| | | | | |
|---|---|---|---|---|
| JP | 11193454 A | 7/1999 | | |
| JP | 2003193139 A | 7/2003 | | |
| JP | 2005291291 A | 10/2005 | | |
| WO | WO9834053 A | 8/1998 | | |
| WO | WO 2005040451 A1 * | 5/2005 | | C23C 14/0605 |
| WO | WO 2008147284 A1 * | 12/2008 | | |

* cited by examiner

METHOD OF MANUFACTURING A BEARING RING

This is a national stage of PCT/EP2009/002038 filed on Mar. 19, 2009.

FIELD OF THE INVENTION

The present invention relates to a method of manufacturing a bearing ring for a rolling element bearing, in which the bearing ring comprises a bearing race made of a bearing grade steel and an overmoulded part that is moulded to the bearing race. The invention further relates to a bearing ring made in this way and to a bearing unit comprising such a bearing ring, especially a flanged bearing unit suitable for supporting a wheel in a vehicle.

BACKGROUND TO THE INVENTION

In the interests of fuel economy, there is an increasing drive within the automotive industry towards weight reduction of the component parts of vehicles. However, the weight reduction needs to be achieved without compromising the necessary strength or robustness of the components and, preferably, without increasing material costs or manufacturing costs.

A vehicle wheel bearing is an example of an automotive component where weight reduction is desirable, also in view of the fact that the wheel end bearings belong to the unsprung weight of a vehicle. Raceways of the bearings need to be made from a material of sufficient hardness in order to withstand the stresses of rolling contact. Titanium and certain ceramics are materials that possess the necessary mechanical properties and are also low in weight. They are also expensive and, consequently, bearing steel is more commonly used. Bearing steels have excellent hardenability but cannot be viewed as lightweight materials. Thus, one solution for obtaining a wheel bearing that is relatively cheap to manufacture and reduced in weight is to form the race part of a bearing ring from bearing steel and to form further parts of the ring from a lightweight material.

In U.S. Pat. No. 6,485,188, a wheel mounting with a bearing race embedded in a cast component is suggested. In one embodiment, the wheel mounting is a hub in which an outer bearing race made from a bearing grade steel is embedded in a cast component that has a radial flange for the attachment of a vehicle wheel. In a further embodiment, the wheel mounting is a steering knuckle that is cast around the outer bearing race. Suggested metals for the cast component are steel, ductile iron and aluminium. After the step of casting, the outer raceways of the bearing race are induction hardened.

There is still room for improvement, however, in terms of simplifying the manufacture a bearing ring comprising a cast or overmoulded part and in terms of realizing a bearing unit comprising such a bearing ring, which is capable of delivering the same mechanical and structural performance as a conventional unit made entirely from e.g. a bearing steel.

SUMMARY OF THE INVENTION

The present invention resides in a method of manufacturing a bearing ring for a rolling element bearing, in which the bearing ring comprises a bearing race made of a bearing grade steel and an overmoulded part that is joined to the bearing race in a moulding process. On one radial side of the bearing race, the bearing race has a surface that is adapted to serve as a raceway for rolling elements of the bearing, whereby the overmoulded part is joined to the bearing race at an opposite radial side. According to the invention, the method comprises a step of subjecting at least the raceway surface of the bearing race to a hardening treatment prior to a step of joining the overmoulded part to the bearing race.

One advantage of the invention is that the bearing race can be hardened according to a standard process used at a bearing ring manufacturing site, thereby reducing costs. Furthermore, hardening prior to moulding can be performed more easily than after moulding, thereby simplifying the manufacture of a bearing ring that comprises an overmoulded part. Similarly, a bearing raceway generally undergoes a machining operation after hardening, to achieve the required tolerances. A machining operation such as hard turning or centreless grinding is also more straightforward to perform prior to moulding, especially if the part moulded to the bearing race has a complex geometry.

In order to withstand rolling contact fatigue in use, at least the raceway surface of the bearing race must undergo a hardening treatment. In a preferred embodiment of the invention, the bearing race undergoes a through hardening process prior to the moulding process. In another embodiment, the raceway surface of the bearing race is surface hardened prior to moulding. Variants of such hardening are induction surface hardening, laser hardening, flame hardening or carburising plus subsequent furnace hardening.

In surface hardening, only the raceway surface is hardened to a defined depth depending on the load cases for the application. This is done by means of localized heating to a temperature at which an austenitic phase transformation occurs, followed by quenching. The remainder of the bearing race is unaffected by the hardening process. In through-hardening, by contrast, the entire component is heated to the phase transformation temperature and then quenched, after which the bearing race displays as essentially constant hardness over its cross-section.

The technique of induction hardening is commonly applied to harden the raceway of a flanged hub, whereby the flange is left unhardened and is designed to resist structural fatigue, while the raceway is hardened and is designed to resist rolling contact fatigue. In the case of a flanged hub adapted for inner ring rotation, the raceway part is arranged within a strong alternating magnetic field in order to induce alternating currents in the raceway surface and generate heat. Induction hardening therefore requires specialized equipment and specialized tooling. Through hardening is more straightforward and is thus preferable. The bearing race can simply be placed in a furnace and heated to the required temperature for the required period of time, before being quenched.

In both types of hardening, the heat treatment involves heating the bearing steel to the autstenitic phase, holding it there until part of the carbon present in the alloy has dissolved, followed by rapid cooling. Upon being rapidly cooled, the main portion of the austenite transforms into martensite or bainite, depending on the cooling conditions. In the case of martensitic hardening, the steel becomes extremely brittle and hard. After quenching, the steel is therefore tempered, which involves reheating the steel to a temperature close to the martensitic start temperature for a period of time until the steel achieves the necessary toughness, while retaining a sufficient hardness. The martensitic start temperature depends on the composition of the bearing steel and the quenching temperature, but most martensitically hardened bearing steels are tempered at a temperature of 150-160° C. In the case of bainitic hardening, the steel is quenched to a temperature of approximately 230° C., held at this temperature for several hours until the austenite phase has transformed into bainite, and then air cooled to room temperature. The resulting bainitically hardened steel is more ductile than martensitically hardened steel and does not need to undergo a tempering treatment.

Typically, a bearing ring is hardened until at least the raceway has a hardness of between 58 and 65 HRC (Rockwell hardness). After hardening, the raceways must not be exposed to excessive temperatures, as this will, in effect, result in an over-tempering that reduces raceway hardness. In the case of a rolling element bearing with martensitically hardened raceways, the bearing is not suited to operating temperatures above approximately 150° C. For a bearing with bainitically hardened raceways, the maximum operating temperature is around 250° C., i.e. the lower bainite transformation temperature.

Similarly, in a bearing ring that comprises a bearing race made of hardened bearing steel and an overmoulded part that is joined to the bearing race in a moulten or semi-moulten state, the temperature of the raceway surface must remain below a predetermined temperature value, being a maximum temperature at which the hardness of raceway surface is not adversely affected. The temperature of the opposite bearing race surface to which the overmoulded part is joined may exceed the predetermined value, since only the raceway surface needs to possess a specific hardness to a depth of approximately 1.5-2.5 mm, depending on the expected loading conditions. Bearing steel is an excellent thermal conductor, however.

In one embodiment of the invention, the overmoulded part of the bearing ring is formed from a thermoplastic material. A high-performance engineering plastic such as polyamide 46 is one example of a plastic material that has the necessary mechanical properties for certain bearing applications. Polyamide 46 has a melting temperature of 295° C. Taking this plastic material as an example, an amount of moulten polyamide 46 having a mass $m_1$ is moulded to the bearing race. The moulten material contains a certain amount of heat energy, which may be calculated from the system enthalpy. Assuming that the temperature of the bearing steel is 25° C. before contact with the moulten plastic (at 295° C.), the system enthalpy $Q_1$ is given by:

$$Q_1=(295-25)\cdot m_1\cdot c_{pa}, \text{ where}$$

$c_{pa}$ is the specific heat capacity of polyamide 46.

In order to raise the temperature of the raceway surface by an amount $\Delta T$ that will cause the raceway surface to reach the predetermined temperature value, an amount of heat energy $Q_2$ is required, which may be calculated from:

$$Q_2=m_2\cdot c_{bs}\cdot \Delta T, \text{ where}$$

$m_2$ is the mass of the bearing race and
$c_{bs}$ is the specific heat capacity of the bearing steel from which the bearing race is made.

Next, assuming that an amount of heat energy $Q_3$ is dissipated in heat transfer losses, e.g. heat transfer to the mould in which the overmoulded part is shaped and heat transfer to the surroundings, then when $Q_2 > Q_1 - Q_3$, the temperature of the raceway surface will not exceed the predetermined temperature value and the hardness of the raceway will be unaffected.

In another embodiment of the invention, the overmoulded part of the bearing ring is formed from aluminium or an alloy thereof. The aluminium part may be joined to the bearing race in e.g. a die casting process at a temperature of around 700° C. Preferably, an aluminium overmoulded part is joined to the bearing race in a semi-solid metal process, being one of a rheocasting process, a rheoforming process, a rheomoulding process, a thixocasting process, a thixoforming process or a thixomoulding process. In the case of a semi-solid metal process, the process temperature is approximately 580° C. When the overmoulded part is made of a metal such as aluminium, the amount (mass) of moulten or semi-solid aluminium that is joined to the bearing race is more likely to contain sufficient heat energy to cause the temperature of the raceway surface to exceed the predetermined temperature value.

Thus, in a further development of the invention, the method comprises a step of controlling the temperature of the raceway surface to keep it below the predetermined temperature value.

In one embodiment, the step of temperature control comprises cooling the raceway surface; for example, by means of circulating a cooling medium past the raceway surface and transferring heat removed from the raceway to a heat exchanger. Advantageously, the cooling medium may have a temperature of between 80° C. and 100° C., to prevent an excessive temperature gradient between the raceway surface of the bearing race and the moulding side and thereby reduce the rate of heat transfer.

In another embodiment, the step of temperature control comprises providing a thermal barrier on the surface of the bearing race opposite from the raceway surface, prior to the step of moulding. The thermal barrier is a layer of material that reduces the amount of heat energy transferred to the bearing race, such that the raceway surface temperature is kept below the predetermined temperature value.

In one embodiment, the thermal barrier is an insulating layer with an extremely low thermal conductivity. The thermal barrier may be a coating of e.g. ceramic aluminium oxide or zirconium oxide that is plasma-sprayed onto the surface of the bearing race radially opposite from the raceway surface. Such a coating has a melting point higher than the moulding temperature. In addition, dental ceramics painted and baked onto the steel can be considered. When the insulating layer is provided on the bearing race by means of a plasma-spraying process or a baking process, the application temperature will exceed the predetermined temperature value to which hardened bearing steel may safely be exposed. Therefore, the insulating layer is preferably provided on the bearing race prior to the hardening treatment. In some embodiments, the insulating layer may be provided after the hardening treatment, in which case the hardened raceway surface is suitably cooled during the application of e.g. an aluminium oxide coating.

In a further embodiment, the thermal barrier is a sacrificial layer that melts during the moulding process, thereby reducing the amount of heat energy transferred to the bearing race due to the enthalpy of transformation. Suitable materials for the sacrificial layer include fusible alloys such as bismuth or indium based alloys, which may be applied to the bearing race by means of metal injection moulding, spraying, casting or dipping. Low-temperature soldering alloys such as tin-silver alloys may also be used. Such soldering alloys may be applied to the bearing ring by means of any appropriate pre-soldering process for example hot dipping, powder technology, or other suitable means. Preferably, the sacrificial layer has a melting point that is lower than the predetermined temperature value. This means that the temperature at which the sacrificial layer is applied will not influence raceway hardness and that the sacrificial layer may be applied after the step of hardening.

In addition to providing heat protection, the thermal barrier can also be selected to facilitate the joining of the overmoulded part to the bearing race. When, for example, a bearing outer ring according to the invention comprises an overmoulded part formed from polyamide 46, a liner of glass-fibre reinforced polymer (GFRP) can be shrink-fitted around the radially outer surface of the bearing race. Such a GFRP liner will act as a thermal insulator and, when the polymer of the liner melts, some of moulten polyamide 46 will become interspersed between the glass fibres, thereby creating a good join. Moreover, when the overmoulded part is made from aluminium, the thermal barrier can prevent the diffusion of aluminium into the iron of the bearing steel. The resulting intermetallics are brittle and may reduce the toughness of the bearing unit.

In a second aspect, the present invention relates to a bearing ring comprising a bearing race made of a bearing grade steel and an overmoulded part made of a lighter-weight material, wherein at least a raceway surface of the bearing race is hardened before the overmoulded part is joined to the bearing race. In a further development, the bearing race comprises a thermal barrier provided between the bearing race and the overmoulded part. The bearing ring may be a bearing outer ring comprising a thermal barrier on a radially outer surface of the bearing race, or may be a bearing inner ring comprising a thermal barrier on the radially inner surface of the bearing race.

In a third aspect, the present invention relates to a bearing unit comprising a bearing ring according to the invention. In a first embodiment, the bearing unit is a wheel bearing unit comprising a bearing outer ring according to the invention and is adapted for outer ring rotation. In this embodiment, the overmoulded part of the bearing ring comprises a radially extending flange provided with means for the attachment of a vehicle wheel.

In a second embodiment of a bearing unit according to the invention, the bearing unit is a wheel bearing unit comprising a bearing outer ring according to the invention and is adapted for inner ring rotation. In one example of the second embodiment, the overmoulded part of the bearing ring comprises a radially extending flange that is provided with means to enable the attachment of the flange to a suspension component of the vehicle. In a further example of the second embodiment, the overmoulded part comprises the suspension component. For example, a steering knuckle or a non-steerable suspension component may be moulded around the bearing race.

In other embodiments, the bearing unit comprises a bearing inner ring according to the invention. Again, the bearing unit may be a wheel bearing unit that is adapted for inner ring or outer ring rotation. When the bearing unit is adapted for driven inner ring rotation, the overmoulded part of the inner ring comprises a radially extending flange provided with means for the attachment of a vehicle wheel and may further be executed with a non-circular bore. Thus, a drive element (e.g. the outboard shaft of a constant velocity joint) with a corresponding non-circular shape can transfer torque to the flanged bearing inner ring. The advantage of a non-circular bore in combination with a flanged inner ring that is partly formed from a lightweight metal such as e.g. aluminium is that the non-circular shape gives added stiffness to the inner ring.

Other advantages of the present invention will become apparent from the detailed description and accompanying drawings.

DESCRIPTION OF THE FIGURES

In the following, the invention is described with reference to the accompanying drawings, in which.

DETAILED DESCRIPTION

The method of the invention will be described with reference to FIG. 1, which shows an axial view of an example of a bearing ring according to the invention. In this example, the ring is a bearing outer ring 101 comprising a bearing race 102 made of a bearing grade steel and an overmoulded part 106 made of a lightweight material. The bearing race 102 has a radially inner surface 103 that will serve as an outer raceway for rolling elements, when the ring 101 forms part of a rolling element bearing. The overmoulded part 106 of the bearing ring 101 is joined to a radially outer surface 104 of the bearing race 102 in a moulding process.

A moulding process is to be understood as any process in which a moulten or semi-moulten material is shaped around the bearing race 102 using a rigid mould, whereby the moulten or semi-moulten material hardens or sets within the mould, adopting its shape. Moulding therefore includes moulding of thermoplastics, die casting of metals and semi-solid metal processes such as thixoforming. As will be understood, when the bearing ring according to the invention is a bearing inner ring, the overmoulded part is shaped within the bearing race and is joined at a radially inner surface.

In applications where a bearing ring is subject to heavy loading, an overmoulded part formed from aluminium or an aluminium alloy is advantageous and a preferred process for joining the aluminium part to the bearing race is a semi-solid metal process such as rheocasting. A semi-solid metal process is a near net shape process in which a metal or metal alloy is formed at a temperature between its liquidus and solidus temperature. The semi-solid metal or metal slurry has thixotropic properties, meaning that the viscosity of the metal slurry decreases when it is subjected to shearing.

In a conventional molten metal process such as casting, the microstructure of the cast metal or metal alloy contains interlocking dendrites that result in material brittleness. In a semi-solid metal process, by contrast, spherical grains are formed, and the metal has fine, uniform microstructures that give enhanced mechanical properties. Semi-solid metal processing is also less susceptible to air entrapment and a component produced in this way has fewer defects and lower porosity than e.g. a cast component. Furthermore, a semi-solid metal process is conducted at a lower temperature than a casting process, meaning that less heat energy is transferred to the bearing race 102, the benefits of which will be described in detail further on.

In use, the raceways of a rolling element bearing must be able to withstand rolling contact fatigue and must therefore have a harness of approximately 58 to 65 HRC, if the bearing is to achieve its rated life. Steels with a carbon content of greater than 0.4 wt. % are therefore used in rolling element bearings, because these steels possess the necessary hardenability. A bearing race in a bearing ring according to the invention is thus suitably made from a bearing grade steel such as the well known through hardening and surface hardening bearing steels as indicated in ISO 683-17, for example ISO683-17/B1 also known as DIN 100Cr6 or SAE52100. For special applications certain stainless steels and tool steels can be used as bearing steel, examples are AISI 430D and M50.

Thus, the method according to the invention comprises a step of producing the bearing race 102 from a bearing grade steel. Any technique that is conventionally applied to manufacture bearing ring blanks may be applied to produce the bearing race, including hot forging and hot and cold rolling of steel tubing.

The method further comprises a step of hardening at least the raceway surface 103 of the bearing race 102. Preferably, the bearing race is subjected to a through hardening treatment, meaning that the bearing race is provided with an essentially constant hardness through its cross-section. Again, standard techniques as applied by bearing manufacturers may be used to harden the bearing race 102. In one embodiment, the bearing race 102 is martensitically hardened. Martensitic hardening involves heating the bearing race to a temperature above the austenitic phase transformation temperature, e.g. 1100° C., holding it at this temperature until part of the carbon has dissolved, followed by rapid cooling or quenching in a quenching medium such as oil or water. When the austenite phase is cooled too rapidly for carbon to diffuse out of the solid solution to form cementite and thus transform into pearlite, the entrapped carbon distorts the crystal lattice and retards the transformation from face-centred cubic (of the austenite phase) to body-centred cubic (of pearlite). A martensitic transformation takes place and the product of the transformation is a body-centred tetragonal (BCT) lattice. This lattice structure is extremely hard, but is also extremely brittle. At this stage, the material has more than sufficient hardness for bearing applications bus does not possess sufficient toughness.

Therefore, after quenching, the bearing race is reheated or tempered, to allow some of the entrapped carbon to diffuse out of the BCT structure and form ferrite. In the case of martensitic hardening, the quenched product is typically tempered for a period of time at a temperature of about 150 to 160° C., i.e. a temperature in the region of the martensite start temperature. Tempering increases toughness, but decreases hardness, and the process must therefore be carefully controlled to ensure that the bearing raceway retains a sufficient hardness to withstand rolling contact fatigue. Tempering also facilitates the relaxation of internal stresses within the material.

In another embodiment, the step of hardening comprises subjecting the bearing race to bainitic hardening. Again, the bearing race 102 is heated to a temperature above the austenitic phase transformation temperature and is rapidly cooled or quenched. In this embodiment, the material is quenched in a medium such as brine, which is held at a temperature above the martensitic phase transformation temperature, e.g. 230° C., until the austenite transforms into bainite. The material is then air-cooled to room temperature. Bainite has the necessary hardness for bearing applications and is more ductile than martensite, meaning that further heat treatment (tempering) is not needed. When subjected to heat, however, a bainitically hardened bearing steel will start to lose hardness at a temperature of around 250° C., i.e. the lower bainite transformation temperature.

The method according to the invention further comprises a step of joining an overmoulded part 106 to the bearing race 102 in a moulding process. In some embodiments, the overmoulded part is made from a thermoplastic material such as polyamide 46, which is moulded to the bearing race at a process temperature of approximately 295° C. In other embodiments, the overmoulded part is made from aluminium or an aluminium alloy that is joined to the bearing race in a die-casting process at a process temperature of around 700° C. An aluminium overmoulded part may also be joined in a semi-solid metal process, which takes place at a temperature of around 580° C. If hardened bearing steel is exposed to any of the aforementioned process temperatures, the result will be a reduction in hardness.

In bearing applications, only the raceway surface 103 of the bearing race 102 needs to possess a hardness of 58-65 HRC to a depth of e.g. approximately 2 mm, depending on the expected bearing loads. Therefore, the surface of the bearing race radially opposite from the raceway surface may be exposed to the process temperatures involved in moulding. However, bearing steel is an excellent thermal conductor and has a low specific heat capacity. It must therefore be determined whether the heat energy transferred to the bearing race from the moulding process is sufficient to cause an increase in temperature at the raceway surface 103 that will adversely affect the raceway hardness.

This depends on a number of factors, including: the specific heat capacity, mass and temperature of the material that is moulded to the bearing race; the mass and thickness of the bearing race; the specific heat capacity, thermal conductivity and thermal diffusivity of the bearing steel; the magnitude of the temperature increase needed to aversely affect hardness, the duration of the bearing race's exposure to an elevated process temperature and the heat transfer to the surroundings. The determination can be made by means of, for example, a thermal transient finite element analysis of the heat transfer through the bearing race.

If it is determined that the moulding process will not cause a damaging increase in temperature at the raceway surface, the overmoulded part is simply joined to the bearing race 102 at the surface 104 opposite from the raceway surface 103. If it is determined that the moulding process will cause a damaging increase in temperature at the raceway surface 103, then the method comprises a step of temperature control in which the raceway surface is kept below a maximum safe temperature at which raceway hardness is not adversely affected. As described previously, when the bearing race 102 has been martensitically hardened, the maximum safe temperature is approximately equal to the temperature at which the bearing race was tempered. When the bearing race has been bainitically hardened, the maximum safe temperature is approximately equal to the lower bainite transformation temperature.

Figure 1:
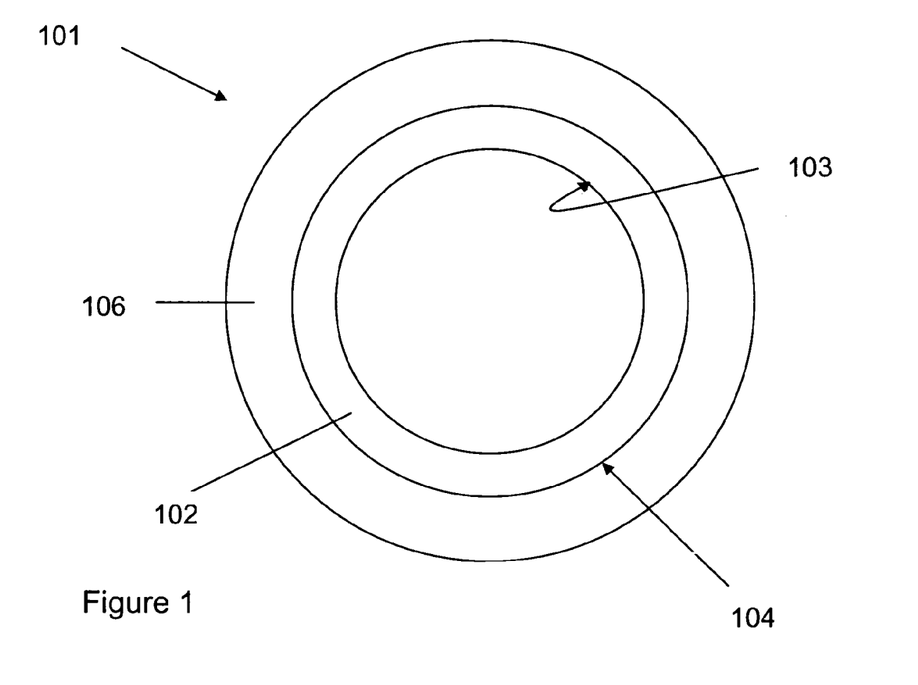
FIG. 1 shows an axial view of an example of a bearing ring according to the invention.
Figure 2:
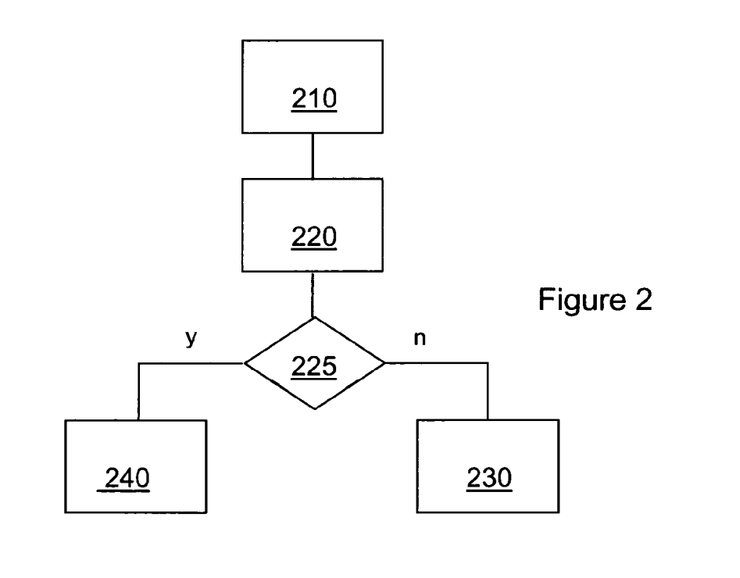
FIG. 2 shows a flow chart of a method according to the invention that may be applied to produce the bearing ring of FIG. 1.

The method according to the invention is depicted in the flowchart of FIG. 2, and may be summarized as follows (also with reference to FIG. 1):

In a first step 210, a bearing race 102 is produced from bearing steel.

In a second step 220, at least a raceway surface 103 of the bearing race 102 is hardened.

In sub-step 225, it is determined whether the joining of the overmoulded part 106 to the bearing race 102 will cause the temperature of the hardened raceway surface 103 to reach the maximum safe temperature, being a maximum temperature which the raceway surface can withstand without suffering a reduction in hardness.

If no, the method comprises a third step 230 of joining the overmoulded part 106 to the bearing race 102 in a moulding process.

If yes, the method comprises a step 240 of joining the overmoulded part 106 to the bearing race 102 in a moulding process, whereby the moulding process comprises cooling the raceway surface 103 to ensure that the temperature of the raceway surface is kept below the maximum safe temperature.

Thus, the method according to the invention comprises a step of temperature control. In the embodiment depicted in the flowchart of FIG. 2, the step of temperature control comprises cooling the raceway surface 103 during the moulding process, to remove heat from the raceway and prevent the temperature exceeding the predetermined value. This can be done by allowing a cooling medium to flow past the raceway surface during the moulding process. For example, by means of a circulating flow of water and a heat exchanger, whereby the water removes heat from raceway surface, which heat is transferred to the heat exchanger before the water is recirculated. The cooling medium and cooling parameters are suitably selected on the basis of how much heat needs to be removed from the raceway, which can be determined from e.g. the finite element analysis. Thus, when the moulding process comprises cooling, a semi-solid metal process has a further advantage over a casting process. The lower process temperature means that less heat needs to be removed from the raceway surface.

Figure 3:
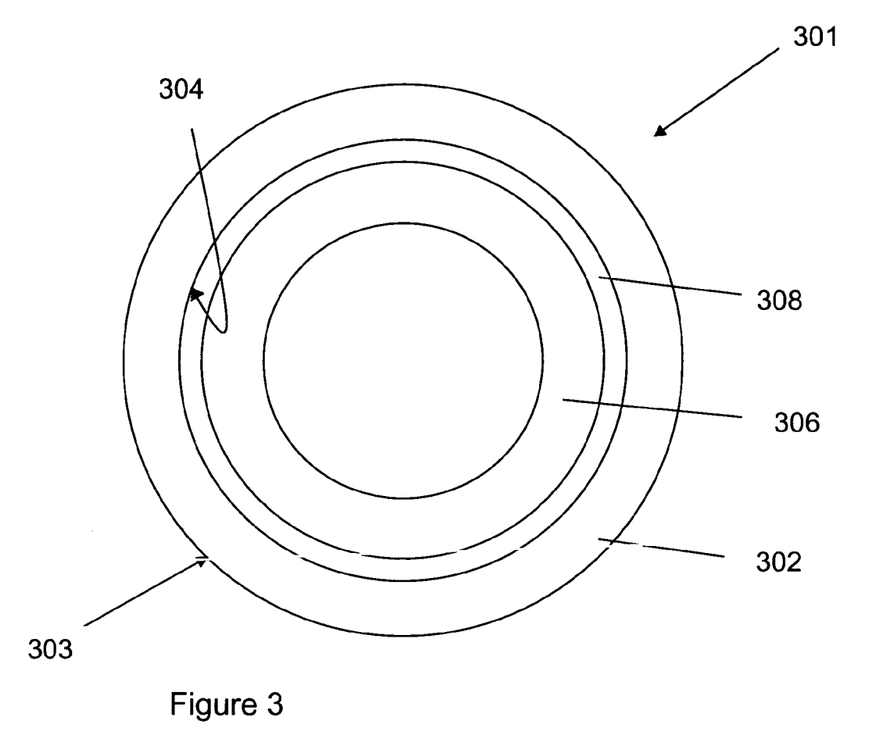
FIG. 3 shows an axial view of a further example of a bearing ring according to the invention.

In an alternative embodiment, the step of temperature control comprises applying a thermal barrier between the bearing race and the overmoulded part. An example of a bearing ring that is made according to this embodiment is shown in FIG. 3. In this example, the bearing ring 301 is a bearing inner ring comprising a bearing race 302 made of a bearing grade steel which has a radially outer surface 303 that has been hardened and is adapted to serve as a raceway for rolling elements of a rolling element bearing. On a radially inner surface 304, the bearing race 302 is provided with a thermal barrier layer 308, and the bearing ring comprises an overmoulded part 306 that is joined to the bearing 302 race in a moulding process, such that the overmoulded part is in contact with the thermal barrier 308.

The thermal barrier is a material interposed between the bearing race 302 and the overmoulded part 306 which reduces the amount of heat energy transferred to the bearing race during the moulding process. In the example shown in FIG. 3, the thermal barrier 308 is a layer of a bismuth alloy, e.g. Bi 58 comprising 58% bismuth and 42% tin. This alloy has a melting point of 138° C. and may be applied to the radially inner surface 304 of the bearing race in an injection moulding process. A temperature of 138° C. will not affect the hardness of bearing steel, and the thermal barrier 308 can be safely applied to a pre-hardened bearing race. Assuming that the moulded part 306 is made from aluminium joined to the bearing race 302 in a semi-solid metal process at a temperature of 580° C., the bismuth alloy layer will start to melt upon contact with the semi-moulten aluminium. Due to the enthalpy of transformation, the temperature of the bismuth alloy will not exceed 138° C. until the alloy has melted. Thus, the transformation consumes energy. After the alloy has melted, the temperature will rise, although bismuth is poor thermal conductor and therefore continues to provide thermal protection to the bearing race. On the basis of e.g. thermal finite element analysis, the thickness of the bismuth alloy layer 308 is suitably selected to prevent an amount of heat energy being transferred from the radially inner side 304 of the bearing race to the raceway 303 that would cause the temperature of the raceway surface to exceed the maximum safe temperature.

A further advantage of a bismuth alloy having more than 50% bismuth, such as Bi 58, is that upon solidification, the material does not shrink away from the surface to which it is applied, but expands somewhat. This is particularly advantageous when the surface in question is a radially inner surface of an annular component such as a bearing inner ring.

Figure 4:
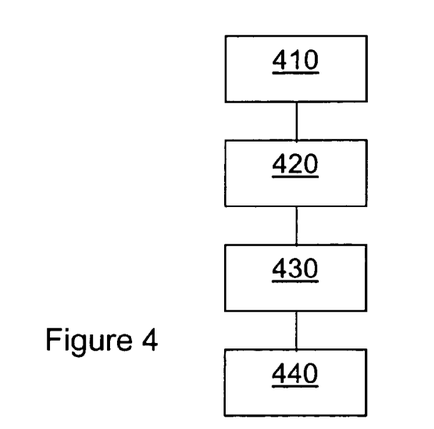
FIG. 4 shows a flow chart of a method according to the invention that may be applied to produce the bearing ring of FIG. 3.

The method according to the invention for producing the bearing ring of FIG. 3 is shown in the flow chart of FIG. 4.

In a first step 410, the bearing race 302 is produced from a bearing grade steel in a manner as previously described.

In a second step 420, at least the raceway surface 303 of the bearing race 302 is subjected to a hardening treatment as previously described.

In a third step 430, a sacrificial thermal barrier 308 is provided on a surface 304 of the bearing race radially opposite from the raceway surface 303.

In a fourth step 440, an overmoulded part 306 is joined to the bearing race 302 in a moulding process, such that the thermal barrier 308 lies between the bearing race and the overmoulded part.

Figure 5:
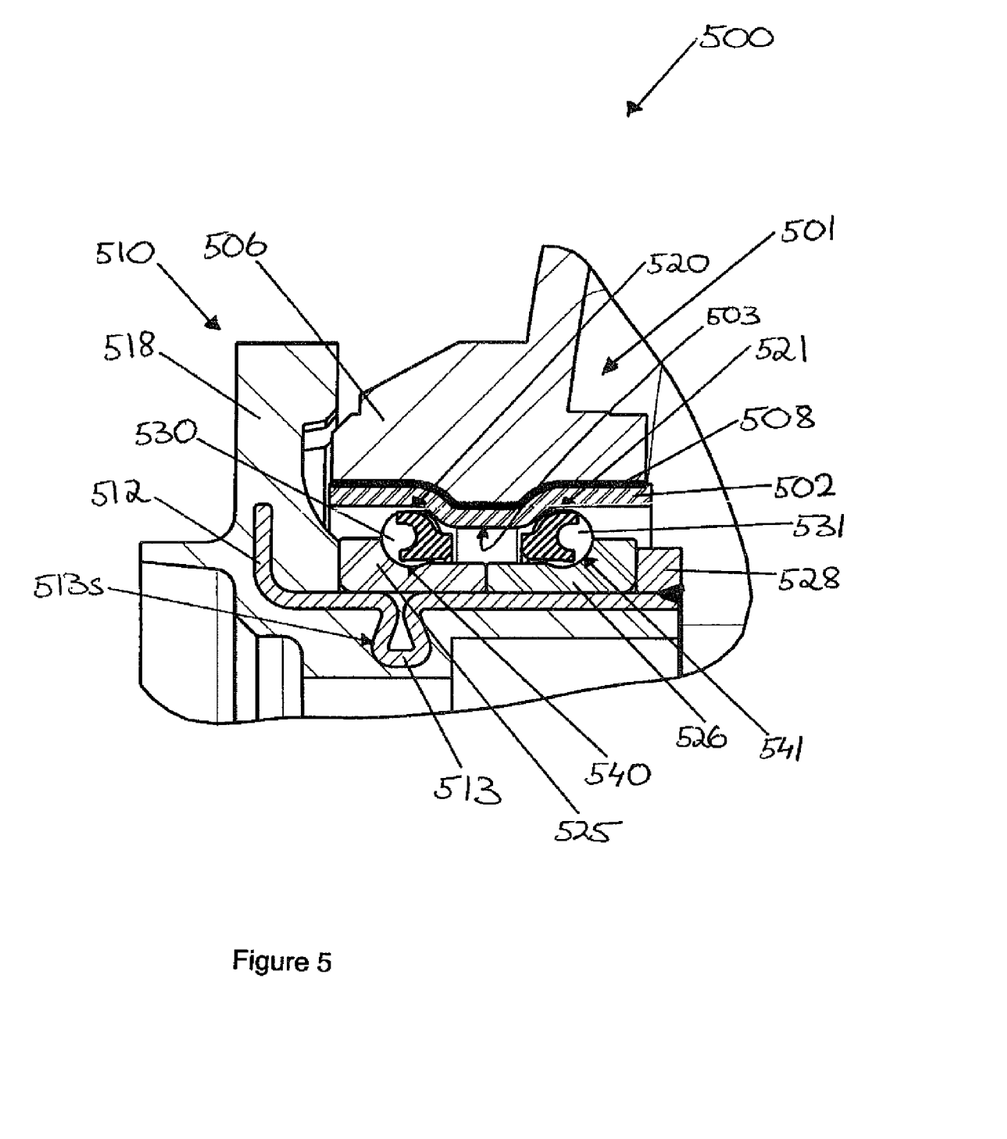
FIG. 5 shows a partial cross-sectional view of a bearing unit comprising a bearing ring according to the invention.

By moulding a lightweight material such as aluminium or a thermoplastic to the bearing race, a bearing ring according to the invention may be used advantageously in applications where weight reduction is desirable; for example, in wheel bearing units. FIG. 5 shows a partial cross-sectional view of an example of a wheel bearing unit comprising a bearing ring in accordance with the invention.

In this example, the wheel bearing unit 500 is one adapted for inner ring rotation and comprises a bearing outer ring 501 according to the invention. The bearing outer ring 501 comprises a bearing race 502 made of a bearing grade steel and an overmoulded part 506 made of aluminium that has been joined to the bearing race in e.g. a rheocasting process. The overmoulded part 506 in this example is a steering knuckle.

Moulding a part around the bearing race 502 has a further advantage, besides enabling a weight reduction relative to conventional bearings that are made entirely from bearing steel. As the overmoulded part cools and solidifies during the moulding process, shrinkage occurs in a radially inward direction. The overmoulded part contracts around the bearing race, thereby imparting an advantageous pre-stress to the bearing race and facilitating a robust and permanent join between the overmoulded part 506 and the bearing race 502.

Prior to the joining process, the bearing race 502 is suitably hardened, e.g. by means of a bainitic through-hardening treatment, and comprises a radially inner surface 503 that has first and second outer raceways 520, 521 for first and second rows of rolling elements 530, 531. The bearing ring 501 further comprises a thermal barrier 508, provided on a radially outer surface of the bearing race, between the overmoulded part 506 and the bearing race 502. In this example, the thermal barrier is a zirconium oxide coating with a thermal conductivity of 0.9 W/m° C. and a melting point of 2700° C., applied to the radially outer surface of the bearing race in a plasma vapour deposition process. The thickness of the zirconium oxide coating 508 is suitably selected to prevent the temperature of the radially inner surface 503 of the bearing race exceeding 250° C. during the rheocasting process, so that the raceways 520, 521 retain their hardness during the rheocasting process. In this embodiment, deposition of the thermal barrier coating takes place at a temperature that will adversely affect the hardness of hardened bearing steel (martensitically or bainitically hardened). Therefore, the coating 508 is suitably applied on the bearing race prior to the hardening treatment.

In order to achieve a further weight reduction, the wheel bearing unit 500 in this example comprises a flanged hub 510 that is also partly made from a lightweight material. The flanged hub 510 comprises an insert 512 made of e.g. a low-carbon steel and an overmoulded part 516 made of e.g. aluminium that is joined to the steel insert 512 in a rheocasting process. The overmoulded part 516 comprises a radially extending flange 518 provided with connection means to enable a vehicle wheel to be mounted to the flanged hub 510. The steel insert 512 provides strength and stiffness to the flanged hub 510 and also serves as a seat for two bearing inner rings 525, 526. The bearing inner rings 525, 526 comprise first and second inner raceways 540, 541 for the first and second rows of rolling elements 530, 531, and the bearing unit 500 is locked up and provided with any necessary preload by means of a locknut 528.

The steel insert 512 can be made from a low carbon steel because the flanged hub 510 does not comprise a surface that needs to be hardenable in order to withstand rolling contact fatigue. As will be understood, in a wheel bearing unit that comprises a flanged hub with a raceway surface, the flanged hub may be produced according to the invention. The steel insert 512 would then be formed from a bearing grade steel, the insert would be hardened and, as necessary, the temperature of the raceway surface would be controlled during the joining of the overmoulded part 516 to the insert 512, to prevent loss of hardness of the raceway surface.

In the example shown in FIG. 5, the steel insert 512 comprises a protruding portion 513 that extends in a radially inward direction, whereby the portion has a surface 513s that faces away from an axis of rotation of the bearing unit. As mentioned above, shrinkage occurs when an overmoulded part cools and solidifies and in the case of annular parts, the shrinkage results in contraction in a radially inward direction. In other words, the overmoulded part 516 of the flanged hub 510 contracts away from the steel insert 512, but contracts against the surface 513s of the portion 513. The portion therefore serves to radially interlock the steel insert 512 and the part 516 moulded thereto. Thus, in a bearing inner ring according to the invention, the bearing race advantageously comprises an inwardly extending portion with at least one surface that faces away from the bearing axis of rotation.

Wheel bearing units in numerous designs can be executed in accordance with the invention. For example, the radially inner surface of an inner ring according to the invention can serve as an outer raceway for rolling elements of a constant velocity joint and the unit can comprise an integral CV joint. Moreover, the bearing unit can be a single row or a double-row angular contact bearing in which the rolling elements are balls, rollers, flattened balls etc. Also, when the unit is a double-row bearing, the raceways for the first and second rows of rolling elements can be equal in diameter, or the diameter can differ. The method according to the invention is not restricted to the manufacturing of bearing rings for automotive applications, but may also be applied to manufacture flanged and non-flanged bearing rings for industrial applications.

A number of aspects/embodiments of the invention have been described. It is to be understood that each aspect/embodiment may be combined with any other aspect/embodiment. The invention may thus be varied within the scope of the accompanying patent claims.

REFERENCE NUMERALS

FIG. 1, showing an axial view of a bearing ring according to the invention.

101 bearing ring
102 bearing race of bearing ring
103 raceway surface of bearing ring
104 surface of bearing race radially opposite from raceway surface
106 overmoulded part of bearing ring FIG. 2, showing a flowchart of an embodiment of the method according to the invention.
210 Produce bearing race from bearing steel.
220 Harden at least raceway surface of bearing race.
225 Determine whether joining of overmoulded part to bearing race will cause the raceway surface to reach a predetermined value.
230 If no, join overmoulded part to bearing race without temperature control.
240 If yes, join overmoulded part to bearing race with temperature control to ensure that raceway surface temperature is kept below predetermined value.

FIG. 3, showing a further embodiment of a bearing ring according to the invention
301 bearing ring
302 bearing race of bearing ring
303 raceway surface of bearing ring
304 surface of bearing race radially opposite from raceway surface
306 overmoulded part of bearing ring
308 thermal barrier (sacrificial layer)

FIG. 4, showing a flowchart of an embodiment of the method according to the invention
410 Produce bearing race from bearing steel.
420 Harden at least raceway surface of bearing race.
430 Provide thermal barrier on surface of bearing race radially opposite from the raceway surface.
440 Join overmoulded part to thermal barrier in a moulding process.

FIG. 5, showing a partial cross-section of a bearing unit according to the invention
500 bearing unit
501 bearing ring according to the invention
502 bearing race
503 raceway surface of bearing race
506 steering knuckle
508 thermal barrier coating
510 flanged hub
512 steel insert
513 inwardly extending portion of insert
513s surface of portion
516 overmoulded part of flanged hub
518 wheel mounting flange
520, 521 outer raceways
525, 526 bearing inner rings
528 locknut
530, 531 rolling elements
540, 541 inner raceways

The invention claimed is:
1. A method of manufacturing a bearing ring for a rolling element bearing, the method comprising:
producing a bearing race of the bearing ring from a bearing grade steel, the bearing race being of annular shape and having a raceway surface adapted to serve as a raceway for rolling elements of the rolling element bearing;
providing an overmoulded part configured to be secured over the bearing race over a surface radially opposite from the raceway surface, the overmoulded part and the bearing race being configured to be axially aligned and configured to rotate relative to a second bearing raceway;

hardening at least the raceway surface of the bearing race;

after the hardening, providing a thermal barrier on a surface of the bearing race radially opposite from the raceway surface such that the thermal barrier lies between the bearing race and the overmoulded part;

after providing the thermal barrier, joining the overmoulded part to the bearing race in a moulding process that includes one of a molten and semi-molten material being shaped around the bearing race, wherein a temperature of the molten or semi-molten material is greater than a predetermined value and the molten or semi-molten material contains a heat energy sufficient to cause the raceway surface to exceed the predetermined value during the moulding process, the predetermined value being a maximum temperature of the raceway surface which can be withstood by the raceway surface without adversely affecting raceway hardness; wherein the thermal barrier is configured such that heat energy transferred to the raceway surface by the molten or semi-molten material is insufficient to cause the temperature of the raceway surface to exceed the predetermined value; and wherein the thermal barrier consists of a material with a melting point lower than the temperature of the molten or semi-molten material such that the thermal barrier is configured to at least partially melt away during the moulding process.

2. A method according to claim 1, wherein the step of hardening further comprises a martensitic heat treatment, and wherein, at least the raceway surface of the bearing race is heated to an austenitic phase transformation temperature that is rapidly cooled in a quenching medium and then reheated for a period of time at a tempering temperature.

3. A method according to claim 1, wherein the step of hardening comprises subjecting at least the raceway surface of the bearing race to a bainitic hardening process.

4. A method according to claim 1, wherein a layer of one of a bismuth alloy and an indium alloy is provided on the bearing race.

5. A method according to claim 1, wherein the overmoulded part is formed from one of an aluminium and an aluminium alloy and is joined to the bearing race in a semi-solid metal process, being one of a rheocasting process, a rheoforming process, a rheomoulding process, a thixocasting process, a thixoforming process and a thixomoulding process.

6. A method according to claim 1, further comprising the step of determining the heat energy required to raise the temperature of the raceway surface to the predetermined value.

* * * * *